Figure 1:
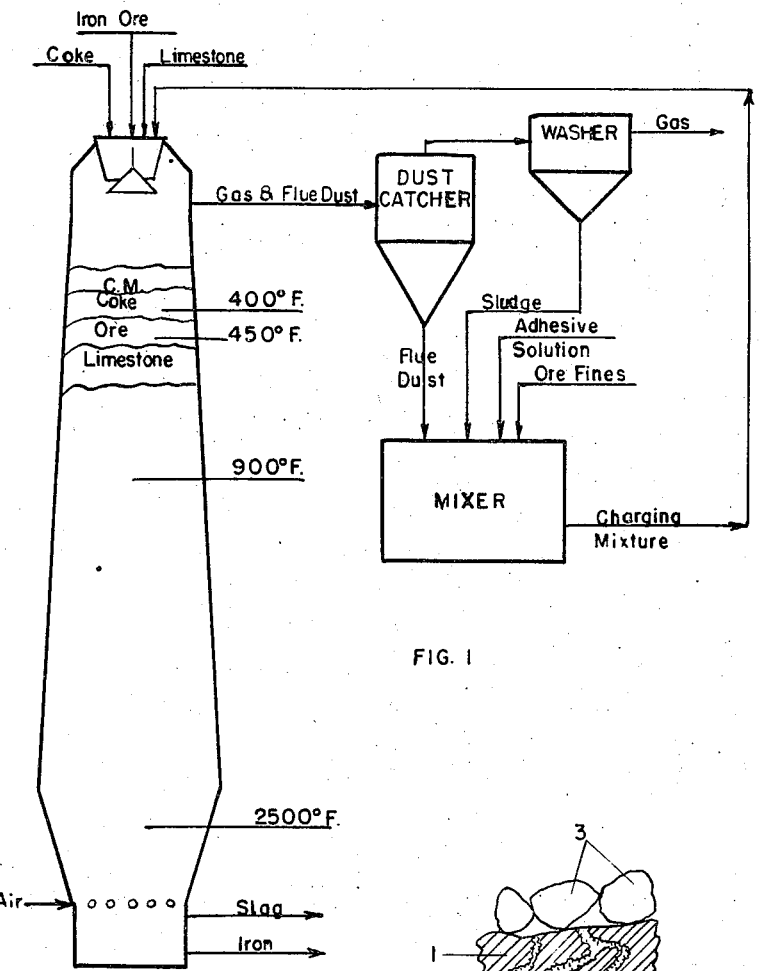

April 10, 1945.　　　　F. HOLZ　　　　2,373,244

BLAST FURNACE PROCESS

Filed Aug. 19, 1943

INVENTOR.
Frank Holz
BY Oberlin, Limbach + Day
Attorneys

Patented Apr. 10, 1945

2,373,244

UNITED STATES PATENT OFFICE 2,373,244

BLAST FURNACE PROCESS

Frank Holz, Cleveland, Ohio

Application August 19, 1943, Serial No. 499,235

9 Claims. (Cl. 75—41)

The present invention relates to a process for operating iron working blast furnaces. The general objects and nature of my invention is to increase the iron production of such furnaces, to utilize waste products therefrom, to effect a substantial savings in fuel, and to reduce substantially the flue dust loss which has heretofore occurred.

The problem of overcoming the loss of iron production due to that relatively large proportion of iron oxide which is carried off by the outlet gases from a blast furnace in the form of flue dust, has always been a serious one. Where relatively fine iron ores, such as for example in the Mesabi and Birmingham ores, the dust loss is particularly large. Flue dust averages about 10 to 40 grains per cubic foot of outlet gas and has been known to run as high as 375 pounds per ton of pig iron produced in the blast furnace operation. Flue dust contains iron oxide, lime and carbon, all being derived from the original charging materials ore, limestone and coke respectively. Obviously then the constituent ingredients of flue dust represent a substantial production loss in blast furnace operations.

Various attempts have been made in the past to recharge flue dust and its related waste product, sludge, back into the blast furnace. These prior efforts to solve the problem have involved the sintering, nodulizing and briquetting of flue dust and sludge, and then re-charging the same into the blast furnace. Such procedures however have proven quite expensive since they involve additional equipment, heating furnaces and additional fuel.

According to the principle of my present invention, I have solved the above-indicated problem by first mixing the iron bearing fines such as flue dust, sludge, together with iron ore fines if need be, with a combustible adhesive and water, and then charging this mixture, which is in the form of a bulk mass having the consistency of wet sand, as part of the blast furnace burden. This moist or wet mass immediately undergoes a drying and agglomerating action as it is charged into the top of the stack of the blast furnace. As the combustible adhesive, such as molasses, glucose, or similar organic, sugary substance is subjected to temperatures on the order of 400 to 450° F., encountered in the top of the blast furnace stack, it decomposes and generates gas bubbles within the interior of the mass of the mixture, which in turn result in the production of channels through which the air blast and gases of combustion can readily pass, thus preventing any packing of the furnace. As additional charges or rounds of coke, limestone and ore are dropped in from the charging bell on the top of the blast furnace, they have the further effect of breaking the relatively hard and set agglomerate up into lumps and pieces which are separated by tortuous passages. These tortuous passages have the additional beneficial effect of entrapping the fine particles of flue dust which arise from the balance of the charge in the blast furnace stack below the zone where my charging mixture has been added, thus substantially reducing the flue dust loss which would normally occur from the original charging materials of ore, coke and limestone.

Additional objects and advantages of my invention will become apparent as the description proceeds.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

Figure 2:
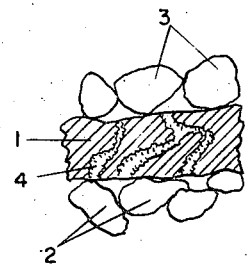

In said annexed drawing:

Fig. 1 is a diagram, in the nature of a flow sheet, illustrating the manner of operation of my process; and Fig. 2 is a more or less diagrammatic, detailed view illustrating the manner in which the tortuous channels or passages are formed in the body of my flue dust and sludge charging composition.

Now referring more particularly to Fig. 1 of the drawing, there is shown therein a diagrammatic representation of an iron work blast furnace. As is well known to those skilled in the art, the operation of such a furnace involves essentially a charging of coke, iron ore and limestone in through the charging bell on the top of the stack of the furnace, and the blowing of air, pre-heated to a temperature of 1250–1800° F. in through the tuyères located substantially at the juncture of the hearth and bosh of the furnace. The air is forced through the furnace at a working pressure of 12 to 18 pounds p. s. i. and the gases of combustion, containing the entrained flue dust are lead from the top of the stack to an extraction system comprising the dust catcher and washer.

Representative temperatures of the charge or burden within the blast furnace are shown in Fig. 1 and at substantially the heights therein where such temperatures occur. As the air blast passes up through the layers of limestone, ore and coke, it not only entrains the relatively fine particles thereof which are produced by mechanical abrasion and contact, but also the fine particles which are produced as a result of the chemical reduction and smelting actions taking place in the furnace. Such fine particles, generally termed "flue dust" in the art, have a relatively high content of ingredients valuable to the iron smelting process. For example J. L. Bray "Ferrous Production Metallurgy" (1942) gives a typical analysis of flue dust as follows: Fe 21-45%, CaO 7 to 13%, carbon 10 to 30%. The flue dust must be removed from the furnace outlet gases in order to utilize the latter, such as in the blast furnace stoves and for collateral combustion purposes. If it were attempted to recharge the flue dust and sludge as such into the blast furnace, not only would a great majority of it be blown back out of the furnace, but the danger of "packing" the charge would occur.

According to my present invention, I utilize the otherwise waste products, but valuable ingredients in flue dust and sludge, by mixing them with an adhesive in water, and possibly iron ore fines, if the latter are available, into a moistened mass which I here term a "charging mixture." A requisite ingredient of my adhesive solution is a combustible, organic sugary substance such as molasses. Silicate of soda ($Na_2SiO_3.9H_2O$) of specific gravity approximately 12 pounds per gallon is also preferably incorporated as an adhesive, since it imparts an initial binding and sustaining action to the charging mixture which is maintained during the thermal decomposition of the molasses or organic adhesive.

The range of the ingredients of my charging mixture is as follows:

Flue dust, sludge, iron ore fines 100 parts by weight
Molasses 12 pounds to 3-4 gallons of water
Silicate of soda ($Na_2SiO_3.9H_2O$) 12 pounds to 3-4 gallons of water
Total water 1 to 20 parts by weight dry basis of flue dust etc.

The adhesive solution is mixed separately and then added in the mixer with the flue dust, sludge and ore fines. The percentage of adhesive solution added varies with the amount of moisture and character of the flue dust, sludge and ore fines. Where the latter ingredients are of a sandy character and hence not "sticky," a larger proportion of adhesive solution and water, approaching the upper limit of 20% is added. On the other hand, where the flue dust, sludge and ore fines are of a clay or sticky nature, a lesser amount of adhesive solution in water is added. The important criterion is that the resultant mixture shall be of the consistency of wet sand and its external adhesive properties shall be such that the mixture will not adhere to the surface of the charging bell of the blast furnace.

As the charging mixture is deposited on the top of the last round of coke, ore and limestone at the stock line of the blast furnace stack, it immediately undergoes a drying and setting action. As will be noted in Fig. 1, the charging mixture (denoted "C. M.") is deposited in the region of the furnace which is at a temperature of approximately 400° F. As the charging mixture then begins to dry and set, the organic adhesive, or molasses, decomposes, tending to form gas bubbles within the interior of the mixture. The air blast coming up through the blast furnace stack then forms these bubbles into channels through which the air can pass. After the charging mixture has thus become set and dried, it then works further down into a higher temperature zone, at which point an incipient fusion or agglomeration takes place, so that the mixture does not return to its original fine particle, or dust like form. During this time, an additional round of iron ore, coke and limestone is charged on the top of the charging mixture with the result that a further cracking and breaking up into lumps of the latter takes place.

As will be seen from Fig. 2, the body of charging mixture 1 is shown interposed between the zones or layers of other charging material such as the limestone pieces 2 and the ore lumps 3. The body of charging mixture 1, is thus broken up to form the tortuous channels 4 through which the air blast passes containing entrained flue dust from the ore, coke and limestone burden lower down in the furnace. These flue dust particles, as denoted by the small dots in the channels or passages 4, become entrapped and retained therein, so that as the charging mixture 1 works further down into the smelting zone of the furnace, such entrapped flue dust is available for metallurgical production, along with the originally charged flue dust, sludge and ore fines contained in the charging mixture proper.

The process of my invention thus reduces the amount of flue dust which would otherwise be produced from the customary charging components of blast furnace operation. In addition it results in a substantial increase in the pig iron product of the furnace, as well as a decrease in the fuel consumption thereof.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In the process of smelting iron in a blast furnace, the improvement which consists in charging thereto a bulk mixture of iron-bearing material of fine particle size, a sugary substance, silicate of soda and water, said mixture being of the consistency of wet sand and having an adhesive property with respect to external surfaces less than that sufficient to adhere to the blast furnace charging bell.

2. In the process of smelting iron in a blast furnace, the improvement which consists in charging thereto a bulk mixture of iron-bearing material selected from the group consisting of flue dust, sludge and iron ore fines, together with a water solution of molasses and silicate of soda in consistency of wet sand and non-adherent to the blast furnace charging bell.

3. In the process of smelting iron in a blast furnace, the improvement which consists in charging thereto a bulk mixture of iron-bearing material selected from the group consisting of flue dust, sludge and iron ore fines, together with a water solution of molasses and silicate of soda, the latter two ingredients each being present in the amount of 12 pounds to 3-4 gallons of water, and the total water content of the mixture being in the range of 1-20% by weight on the dry basis of the iron-bearing material present.

4. In iron working blast furnace process comprising the steps of separating flue dust and sludge from the stack outlet gas, mixing said flue dust and sludge with water solution of molasses and silicate of soda to the consistency of wet sand, and then directly charging the resultant mixture as part of the blast furnace burden.

5. In iron working blast furnace process comprising the steps of separating flue dust and sludge from the stack outlet gas, adding iron ore fines to said flue dust and sludge, mixing therewith a water solution of molasses and silicate of soda to the consistency of wet sand, and then directly charging the resultant mixture as part of the blast furnace burden.

6. An iron working blast furnace process comprising the steps of charging a round of coke, iron ore and limestone to the furnace, separating flue dust and sludge from the stack outlet gas, mixing said flue dust and sludge with a water solution of molasses and silicate of soda to the consistency of wet sand, directly adding the resultant mixture on top of such previously charged round, permitting such mixture to become dried and set, and then dropping an additional charging round on such dried and set mixture whereby the latter is broken into lumps.

7. An iron working blast furnace process comprising the steps of charging a round of coke, iron core and limestone to the furnace, separating flue dust and sludge from the stack outlet gas, adding iron ore fines to said flue dust and sludge, mixing therewith a water solution of molasses and silicate of soda to the consistency of wet sand, directly adding the resultant mixture on top of such previously charged round, permitting such mixture to become dried and set, and then dropping an additional charging round on such dried and set mixture whereby the latter is broken into lumps.

8. An iron working blast furnace charging composition comprising iron-bearing material selected from the group consisting of flue dust, sludge and iron ore fines, together with a water solution of equal parts by weight of molasses and silicate of soda, the resultant product being unmolded and having the consistency of wet sand.

9. An iron working blast furnace charging composition comprising iron-bearing material selected from the group consisting of flue dust, sludge and iron ore fines, together with a water solution of molasses and silicate of soda, said molasses and silicate of soda being present in the amount of 12 pounds to 3–4 gallons of water of said solution, and the total water content of said composition being in the range of 1–20% by weight on the dry basis of iron-bearing material present. as an unmolded product.

FRANK HOLZ.